US011511726B2

(12) United States Patent
Park (10) Patent No.: US 11,511,726 B2
(45) Date of Patent: Nov. 29, 2022

(54) ECO-FRIENDLY VEHICLE AND METHOD OF CONTROLLING DRIVING FORCE FOR THE SAME

(71) Applicants: HYUNDAI MOTOR COMPANY, Seoul (KR); KIA MOTORS CORPORATION, Seoul (KR)

(72) Inventor: Joon Young Park, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 282 days.

(21) Appl. No.: 17/090,614

(22) Filed: Nov. 5, 2020

(65) Prior Publication Data

US 2021/0179056 A1 Jun. 17, 2021

(30) Foreign Application Priority Data

Dec. 16, 2019 (KR) .................. 10-2019-0168086

(51) Int. Cl.
*B60W 10/119* (2012.01)
*B60W 20/00* (2016.01)
(Continued)

(52) U.S. Cl.
CPC ......... *B60W 10/119* (2013.01); *B60K 17/356* (2013.01); *B60W 10/06* (2013.01); *B60W 10/08* (2013.01); *B60W 20/00* (2013.01); *B60K 6/52* (2013.01); *B60W 30/02* (2013.01); *B60W 2510/244* (2013.01);
(Continued)

(58) Field of Classification Search
CPC .... B60W 10/119; B60W 10/06; B60W 10/08; B60W 20/00; B60W 30/02; B60W 2510/244; B60W 2710/0666; B60W 2710/083; B60W 2720/26;
(Continued)

(56) References Cited

U.S. PATENT DOCUMENTS

2006/0071551 A1* 4/2006 Taniguchi ............. B60T 8/1755
303/146
2016/0129901 A1* 5/2016 Migita ..................... B60K 6/52
903/910

(Continued)

FOREIGN PATENT DOCUMENTS

CN 101378926 B * 10/2011 ......... B60K 23/0808

*Primary Examiner* — Tisha D Lewis
(74) *Attorney, Agent, or Firm* — McDonnell Boehnen Hulbert & Berghoff LLP (57) ABSTRACT

A method of distributing driving force of a four wheel drive (4WD) eco-friendly vehicle includes determining a first allowable range of driving force for each driving force based on determination of travel stability, determining a second allowable range of driving force for each driving wheel based on system limitations of at least one of the first driving source or the second driving source, determining a range of available driving force of the first driving wheel based on the first allowable range of driving force and the second allowable range of driving force, determining first target driving force of the first driving wheel in consideration of efficiency of the first driving source within the range of available driving force, and determining second target driving force of the second driving wheel based on the first target driving force and requested torque.

17 Claims, 8 Drawing Sheets (51) Int. Cl.
  *B60W 30/02* (2012.01)
  *B60W 10/06* (2006.01)
  *B60W 10/08* (2006.01)
  *B60K 17/356* (2006.01)
  *B60K 6/52* (2007.10)

(52) U.S. Cl.
  CPC ............... *B60W 2710/0666* (2013.01); *B60W 2710/083* (2013.01); *B60W 2720/26* (2013.01); *B60W 2720/30* (2013.01); *B60Y 2200/91* (2013.01); *B60Y 2200/92* (2013.01); *B60Y 2400/82* (2013.01)

(58) Field of Classification Search
  CPC ........... B60W 2720/30; B60Y 2400/82; B60Y 2200/92; B60Y 2200/91; B60K 6/52; B60K 17/356
  See application file for complete search history.

(56) References Cited

U.S. PATENT DOCUMENTS

2016/0236672 A1* 8/2016 Yanagida ............... B60W 10/06
2018/0079320 A1* 3/2018 Moriya .................. B60L 15/20
2021/0170870 A1* 6/2021 Oh ....................... B60K 17/356

\* cited by examiner

-Prior Art-

FIG. 1

-Prior Art-

ECO-FRIENDLY VEHICLE AND METHOD OF CONTROLLING DRIVING FORCE FOR THE SAME

CROSS REFERENCE TO RELATED APPLICATIONS

This application claims the benefit of Korean Patent Application No. 10-2019-0168086, filed on Dec. 16, 2019, which is hereby incorporated by reference as if fully set forth herein.

BACKGROUND

Field

The present disclosure relates to an eco-friendly vehicle including a driving motor and a method of controlling driving force therefor, and more particularly to a four wheel drive (4WD) eco-friendly vehicle including different power sources for respective drive wheels and a method of controlling driving force therefor.

Discussion of the Related Art

A general vehicle uses any one of front and rear wheels as a driving wheel and only two wheels of four wheels generate driving force, and thus the vehicle is also referred to as two wheel drive (2WD). In contrast, a vehicle that includes front and rear wheels and all of which generate driving force, all of four wheels are driving wheels, and thus such a driving method is referred to four wheel drive or 4WD.

Figure 1:
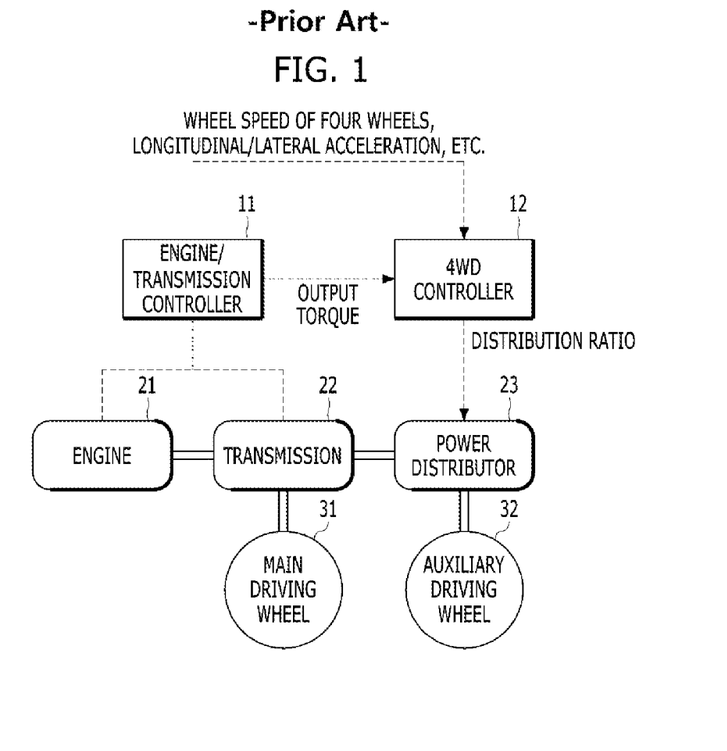
FIG. 1 is a diagram showing an example of the configuration of general four wheel drive.

FIG. 1 is a diagram showing an example of the configuration of general four wheel drive.

Referring to FIG. 1, an engine/transmission controller 11 may control an engine 21 and a transmission 22. A four wheel drive (4WD) controller 12 may analyze a behavior of a vehicle based on output torque information, a wheel speed of each wheel, longitudinal/lateral acceleration information, or the like, which is acquired from the engine/transmission controller 11, and may calculate a distribution ratio of driving force of a main driving wheel 31 and an auxiliary driving wheel 32 such that driving force of each driving wheel is within a limit of grip between a tire and a road surface. The 4WD controller 12 may control coupling strength of a hydraulic clutch in a power distributor 23 based on the calculated distribution ratio and may distribute driving force to the auxiliary driving wheel.

As a result, a concept of control of the 4WD controller 12 is used for distributing power to ensure grip force of each driving wheel, and the grip force is affected by a friction coefficient and normal force, which will be described with reference to FIG. 2.

Figure 2:
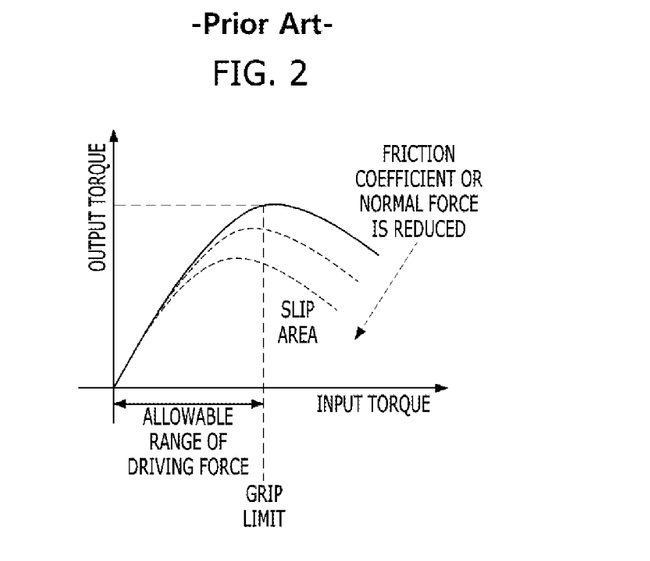
FIG. 2 is a diagram showing an example of a relationship between input torque and output torque depending on a friction coefficient and normal force.

FIG. 2 is a diagram showing an example of a relationship between input torque and output torque depending on a friction coefficient and normal force.

In FIG. 2, a horizontal axis indicates input torque and a vertical axis indicates output torque. Referring to FIG. 2, in a general situation, input torque and output torque are maintained in a proportional relationship up to a grip limit depending on a friction coefficient and normal force between a tire and a road surface. However, when the input torque exceeds the grip limit, the output torque may be lowered while the tire loses grip force and slips on the road surface (that is, a wheel spin occurs). However, the grip limit is lowered as the friction coefficient or the normal force is lowered, and thus a four wheel drive controller needs to continuously determine the grip limit depending on a behavior of a vehicle or a situation.

To this end, control of the four wheel drive controller is broadly classified into feedforward control and feedback control.

The feedforward control includes launch control related to a longitudinal direction and turning (handling) control related to a lateral direction.

In the case of launch control, the four wheel drive controller performs control for lowering driving force of a corresponding driving wheel because normal force of some driving wheels (e.g., front wheels in the case of sudden acceleration or an uphill road) is lowered along with weight transfer of a vehicle in a situation in which the vehicle is launched through sudden acceleration or is launched on a slope way launch. In the case of turning control, when driving force of front wheels is excessively large while a vehicle turns, understeer whereby a turning angle is smaller than a steering angle occurs, and when driving force of rear wheels is excessively large while the vehicle turns, oversteer whereby the turning angle is greater than the steering angle occurs, and thus the four wheel drive controller may distribute driving force to each driving wheel in order to prevent the understeer or the oversteer. In other words, in the launch control or the turning control, feedforward control is applied to prevent slip in advance.

The feedback control is generally applied to longitudinal-direction slip control, in which case feedback control for reducing slip that already occurs is applied to escape from the state of irregular frictional force of a road surface or a rough road.

However, a method of distributing some of driving force of a main driving wheel to an auxiliary driving wheel depending on vehicle behavior characteristics is effective only in a system having one power transfer path to a driving wheel in a similar way to the form shown in FIG. 1. That is, in a system in which separate driving sources are respectively connected front and rear wheels in an eco-friendly vehicle such as an electric vehicle (EV) or a hybrid electric vehicle (HEV), separate technologies for distributing driving force need to be integrated.

For example, a hybrid vehicle including the powertrain shown in FIG. 1 in which an electric motor (not shown) is additionally installed between the engine 21 and the transmission 22 has substantially one power transfer path, but when separate driving sources (e.g., different engines, different motors, or combinations thereof) without the power distributor 23 transfer driving force to the auxiliary driving wheel 32, separate technologies for distributing driving force are required.

SUMMARY

Accordingly, the present disclosure is directed to an eco-friendly vehicle that adopts four wheel drive (4WD) for more effectively distributing driving force and a method of controlling brake of the vehicle.

The technical problems solved by the embodiments are not limited to the above technical problems and other technical problems which are not described herein will become apparent to those skilled in the art from the following description.

To achieve these objects and other advantages and in accordance with the purpose of the disclosure, as embodied and broadly described herein, a method of distributing driving force of four wheel drive (4WD) eco-friendly vehicle includes a first driving wheel connected to a first driving source and a second driving wheel connected to a second driving source, determining a first allowable range of driving force for each driving wheel based on determination of travel stability, determining a second allowable range of driving force for each driving wheel based on system limitations of at least one of the first driving source or the second driving source, determining a range of available driving force of the first driving wheel based on the first allowable range of driving force and the second allowable range of driving force, determining first target driving force of the first driving wheel based on efficiency of the first driving source within the range of available driving force, and determining second target driving force of the second driving wheel based on the first target driving force and requested torque.

In another aspect of the present disclosure, a four wheel drive (4WD) eco-friendly vehicle includes a first driving source, a first driving wheel connected to the first driving source, a second driving source, a second driving wheel connected to the second driving source, a first controller configured to determine a first allowable range of driving force for each driving wheel based on determination of travel stability, and a second controller configured to determine a second allowable range of driving force for each driving wheel based on system limitations of at least one of the first driving source or the second driving source, to determine a range of available driving force of the first driving wheel based on the first allowable range of driving force and the second allowable range of driving force, to determine first target driving force of the first driving wheel based on efficiency of the first driving source within the range of available driving force, and to determine second target driving force of the second driving wheel based on the first target driving force and requested torque.

BRIEF DESCRIPTION OF THE FIGURES

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the embodiments of the present disclosure will be described in detail with reference to the accompanying drawings so as to be easily implemented by those skilled in the art. However, the present disclosure may be variously implemented, and is not limited to the embodiments described herein. In the drawings, in order to clearly describe the present disclosure, portions which are not related to the description of the present disclosure will be omitted, and similar portions are denoted by similar reference numerals throughout the specification.

Throughout the specification, when a certain portion is said to "include" a certain component, this does not indicate that other components are excluded, and the same may be further included unless specifically described to the contrary. The same reference numbers will be used throughout the drawings to refer to the same or like parts.

An embodiment of the present disclosure provides a method of determining a range of driving force based on the travel stability for each driving wheel and a system situation and lastly determining driving force for each driving wheel based on the efficiency of a powertrain within the range of the driving force in an eco-friendly vehicle in which different driving sources are installed in front and rear wheels.

For example, an eco-friendly vehicle applicable to an embodiment may include a first power source for providing driving force to a front wheel and a second power source for providing driving force to a rear wheel. Here, the first power source may include a first engine or a first motor or may be configured by coupling the first engine and the first motor in parallel or in series/parallel to each other. The second power source may include a second engine different from the first engine or a second motor different from the first motor or may be configured by coupling the second engine and the second motor in parallel or in series/parallel to each other.

First, the configuration of a powertrain to which embodiments of the present disclosure are applicable will be described with reference to FIG. 3.

Figure 3:
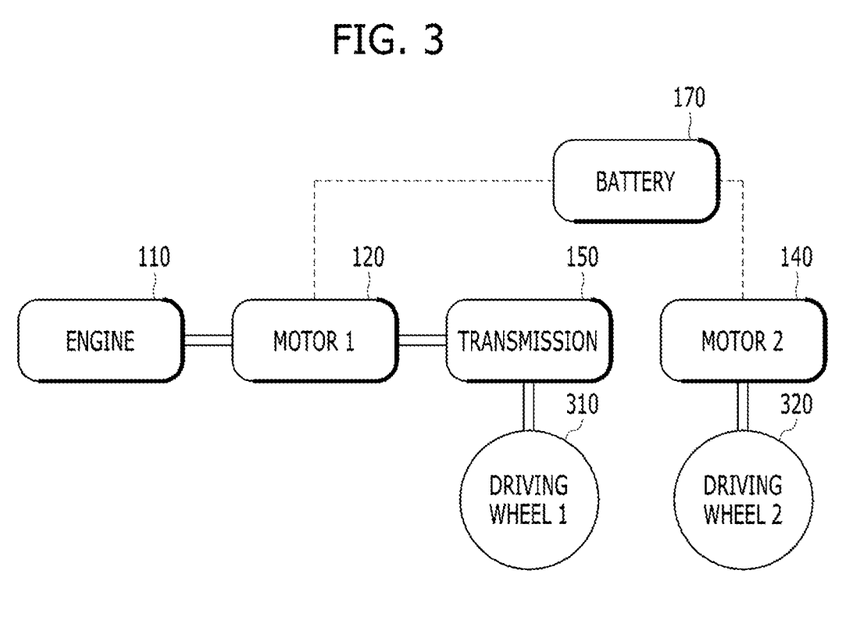
FIG. 3 is a diagram showing an example of the configuration of a hybrid vehicle applicable to embodiments of the present disclosure.

FIG. 3 is a diagram showing an example of the configuration of a hybrid vehicle applicable to embodiments of the present disclosure.

Referring to FIG. 3, a driving shaft of a hybrid powertrain configured by combining an engine 110 and a first motor 120 may be connected to a first driving wheel 310 through a transmission 150, and a driving shaft of a second motor 140 may be connected to a second driving wheel 320 without a transmission.

The first motor and the second motor may receive power from a battery 170.

Needless to say, the configuration of the vehicle of FIG. 3 is exemplary, and the present disclose is not limited to any particular powertrain combination as long as separate driving sources are connected to respective driving wheels and provide driving force as described above. For example, the first driving wheel 310 and the second driving wheel 320 may be driven by different motors only, respectively, and a transmission (not shown) may be additionally installed between the second driving wheel 320 and the second motor 140. As another example, the first motor 120 may be omitted from the hybrid powertrain, and the first driving wheel 310 may be driven by the engine 110 only.

However, in the following description, for convenience of description, the configuration of the vehicle shown in FIG. 3 is exemplary, and it is assumed that the first driving wheel 310 is a rear wheel and that the second driving wheel 320 is a front wheel.

Figure 4:
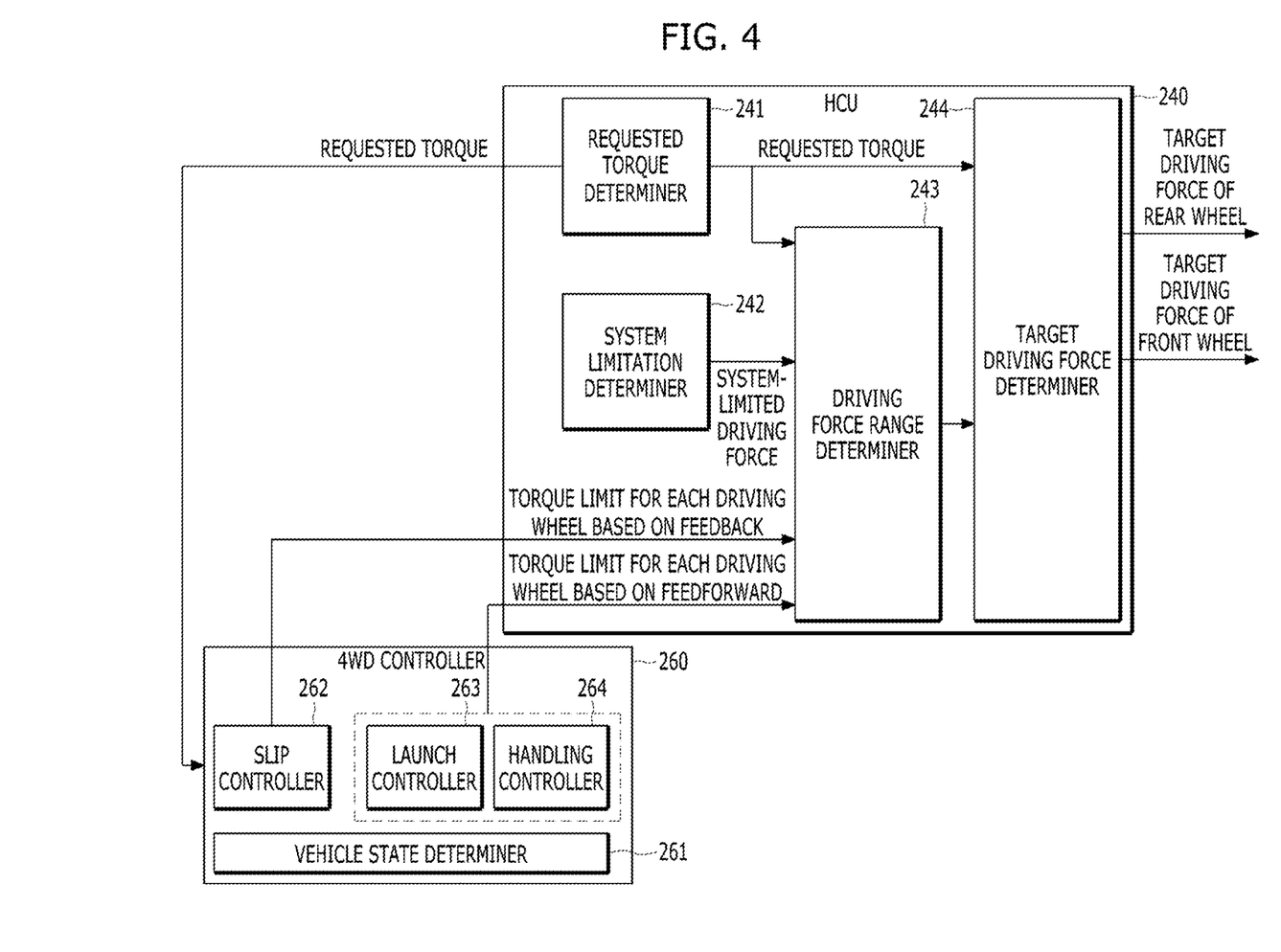
FIG. 4 is a diagram showing an example of a control system according to an embodiment of the present disclosure.

FIG. 4 is a diagram showing an example of a control system according to an embodiment of the present disclosure.

Referring to FIG. 4, a hybrid vehicle according to an embodiment may include a hybrid control unit (HCU) 240 and a four wheel drive (4WD) controller 260 in order to determine driving force for each driving wheel. Needless to say, when different motors are installed in a front wheel and a rear wheel, respectively, the HCU 240 may be replaced with a controller appropriate for a powertrain, and for example, the HCU 240 may be replaced with a vehicle control unit (VCU).

The HCU 240 may include a requested torque determiner 241, a system limitation determiner 242, a driving force range determiner 243, and a target driving force determiner 244, and a four wheel drive controller 260 may include a vehicle state determiner 261, a slip controller 262, a launch controller 263, and a handling controller 264.

The vehicle state determiner 261 of the four wheel drive controller 260 may determine behavior characteristics related to the travel stability of a vehicle based on at least one of torque requested by a driver, a vehicle speed for each driving wheel, a steering angle, a longitudinal acceleration, or a lateral acceleration, may estimate normal force for each driving wheel depending on the behavior characteristics, and may determine a grip force limit for each driving wheel.

In this case, the slip controller 262 may determine whether slip occurs for each driving wheel, and may transmit a torque limit for each driving wheel, which is determined based on feedback control, to the driving force range determiner 243 of the HCU 240.

The launch controller 263 and the handling controller 264 may transmit a torque limit for each driving wheel, which is determined based on feedforward control in a situation in which a vehicle starts at a slope way, is suddenly accelerated, or turns, to the driving force range determiner 243 of the HCU 240.

Then, the requested torque determiner 241 of the HCU 240 may determine the torque requested by a driver based on an accelerator pedal sensor (APS) value, a vehicle speed, driving mode setting, and the like and may provide the determined requested torque to another component inside the HCU 240 or the four wheel drive controller 260.

The system limitation determiner 242 may determine system-limited driving force for each driving wheel depending on capacity (maximum output, maximum torque, or maximum RPM) of a driving source connected to each of a front wheel and a rear wheel, such as an engine or a motor and may transmit information on the determined driving force to the driving force range determiner 243.

The driving force range determiner 243 may determine a range of available driving force based on any one of the front wheel and the rear wheel in consideration of the requested torque determined by the requested torque determiner 241, the system-limited driving force for each driving wheel determined by the system limitation determiner 242, a torque limit for each driving wheel based on feedback provided by the four wheel drive controller 260, and a torque limit for each driving wheel based on feedforward. A detailed method of determining a range of available driving force by the driving force range determiner 243 will be described with reference to FIGS. 5 and 6.

Figure 5:
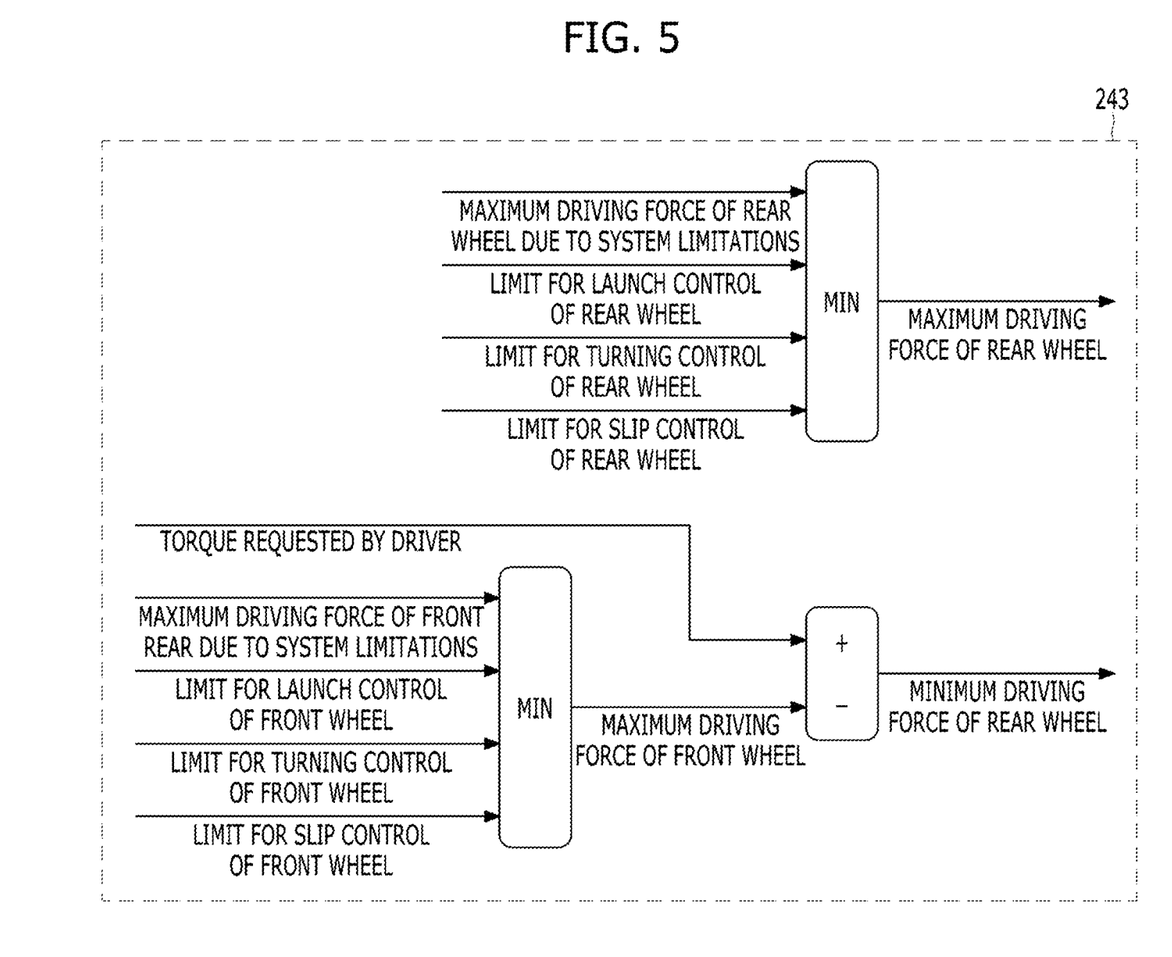
FIG. 5 is a diagram showing an example of an operation of a driving force range determiner according to an embodiment of the present disclosure.

FIG. 5 is a diagram showing an example of an operation of a driving force range determiner according to an embodiment of the present disclosure.

Referring to FIG. 5, the driving force range determiner 243 may determine the range of available driving force in an integration type based on a rear wheel.

In detail, the smallest value among the maximum driving force of the rear wheel, a torque limit for launch control of the rear wheel, a torque limit for turning control of the rear wheel, and a torque limit for slip control of the rear wheel due to system limitations may be determined as the maximum driving force of the rear wheel.

In addition, the smallest value among the maximum driving force of the front wheel, a torque limit for launch control of the front wheel, a torque limit for turning control of the front wheel, and a torque limit for slip control of the front wheel due to system limitations may be determined as the maximum driving force of the front wheel, and a value obtained by subtracting the determined maximum driving force of the front wheel from the torque requested by a driver may be determined as the minimum driving force of the rear wheel. In this case, the minimum driving force of the rear wheel may refer to a minimum value for ensuring grip of the front wheel, and the maximum driving force of the rear wheel may refer to a maximum value for ensuring grip of the rear wheel.

However, like the second driving wheel 320 of FIG. 3, power of a driving shaft connected to a motor only has a system-limited value that is changed depending on the state of charge of a battery, and thus a 4WD control item that requires the behavior characteristics that are always the same, for example, a turning control limit may be set to a limit that is capable of being always output irrespective of remaining power of a battery. In this case, a method of determining the maximum driving force of the front wheel may be modified as shown in FIG. 6.

Figure 6:
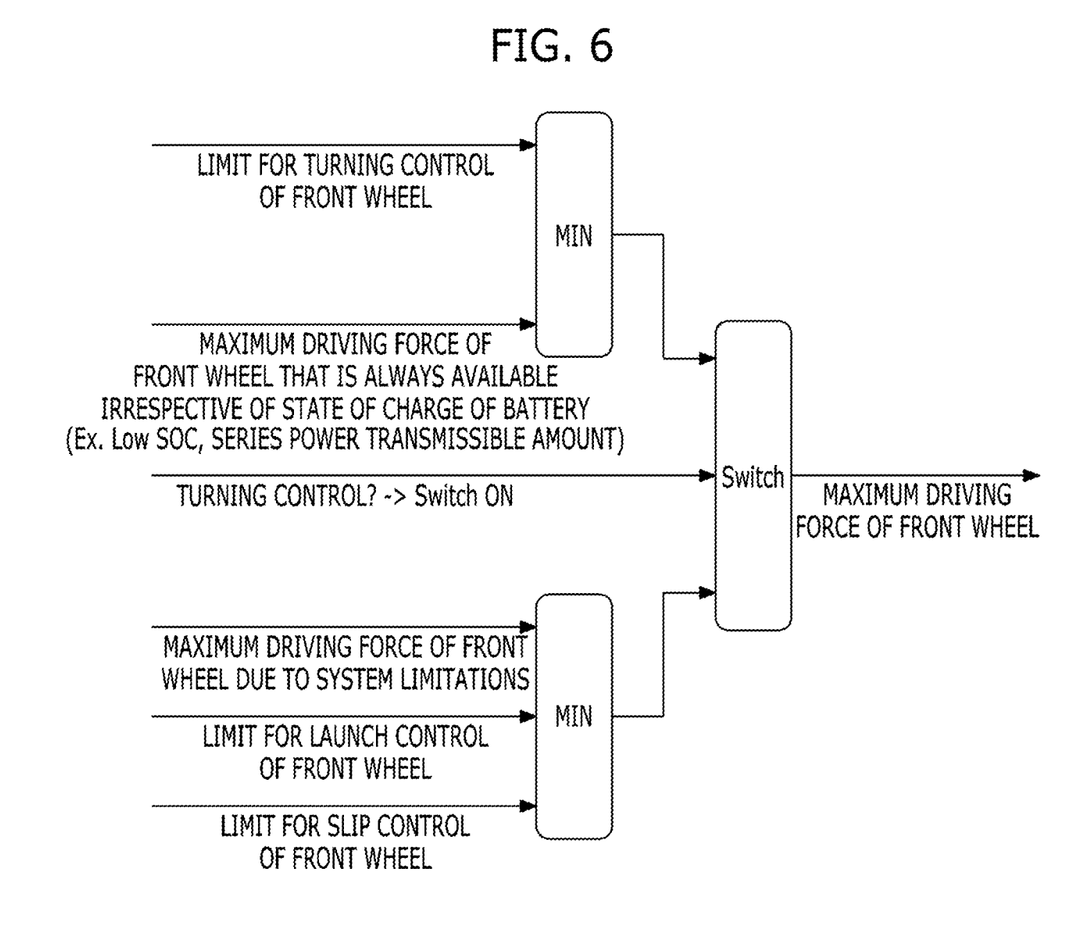
FIG. 6 is a diagram showing another example of an operation of a driving force range determiner according to an embodiment of the present disclosure.

FIG. 6 is a diagram showing another example of an operation of a driving force range determiner according to an embodiment of the present disclosure.

Referring to FIG. 6, when the maximum driving force of a driving wheel connected to only a motor, that is, the maximum driving force of the front wheel in terms of FIG. 3, is calculated, assuming that turning control is being performed (i.e., switch ON when turning control is performed), the torque limit for turning control of the front wheel related to stability at turning may be replaced with a smaller value of the value determined by the handling controller 264 and the maximum driving force that is always available irrespective of the state of charge of a battery. Here, the maximum driving force irrespective of the state of charge of the battery may refer to the maximum driving force to be output from a motor connected to a corresponding driving wheel in a situation of a Low SoC preset for the efficiency of a battery and system protection or a series mode in which a battery is charged using power of an engine.

Figure 7:
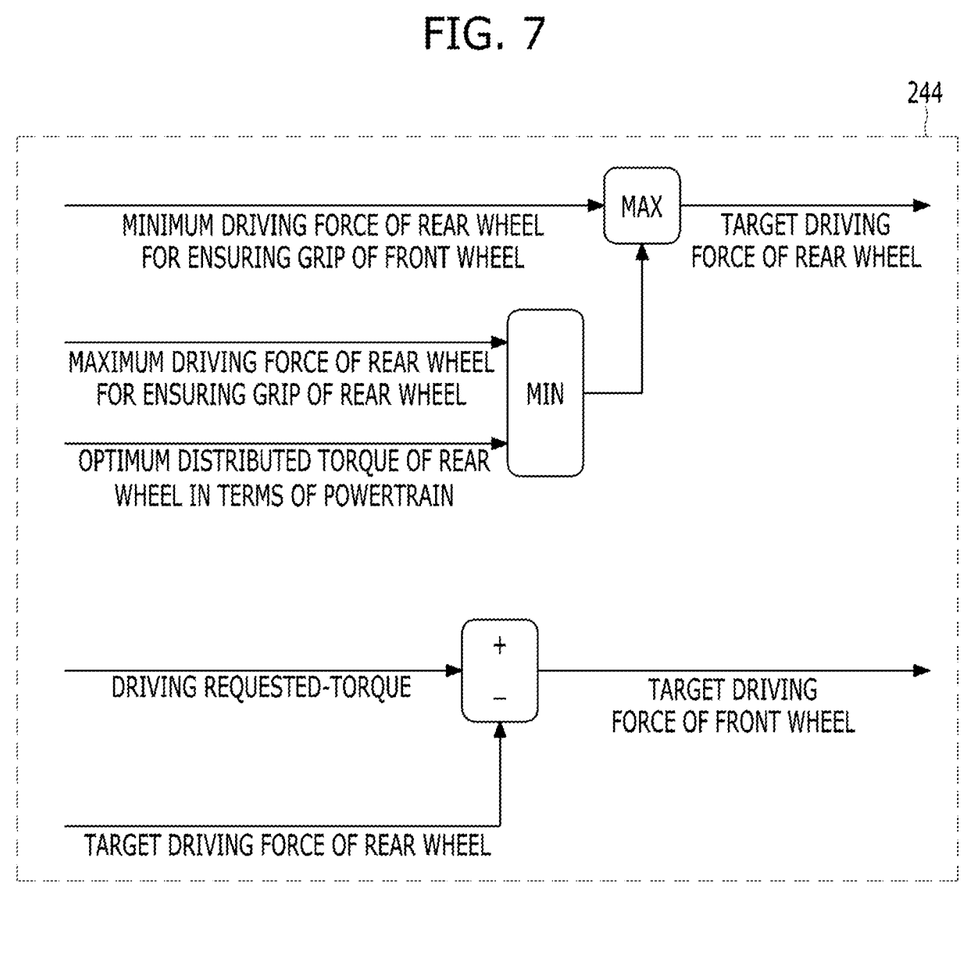
FIG. 7 is a diagram showing an example of an operation of a target driving force determiner according to an embodiment of the present disclosure.

When the driving force range determiner 243 determines the range of available driving force including the maximum driving force and the minimum driving force of the rear wheel, the target driving force determiner 244 may determine each of target driving force of the rear wheel and target driving force of the front wheel, which correspond to last driving force, based on torque for optimum efficiency of driving source connected to the rear wheel within the range of available driving force, which will be described with reference to FIG. 7.

FIG. 7 is a diagram showing an example of an operation of a target driving force determiner according to an embodiment of the present disclosure.

Referring to FIG. 7, the target driving force determiner 244 may compare a smaller value of optimum torque in terms of efficiency of a powertrain (driving source) and the maximum driving force of the rear wheel determined by the driving force range determiner 243 with a greater value of the optimum torque and the minimum driving force of the rear wheel determined by the driving force range determiner 243 and may determine a great value as a comparison result, as the target driving force of the rear wheel. The target driving force of the front wheel may be a value obtained by subtracting the determined target driving force of the rear wheel from the torque requested by a driver (driving requested torque).

The target driving force of the rear wheel in terms of the configuration of the vehicle shown in FIG. 3 may be transferred to a controller (not shown) for controlling the second motor 140 and the target driving force of the front wheel may be transferred to a controller (not shown) for controlling the engine 110 and the first motor 120.

Figure 8:
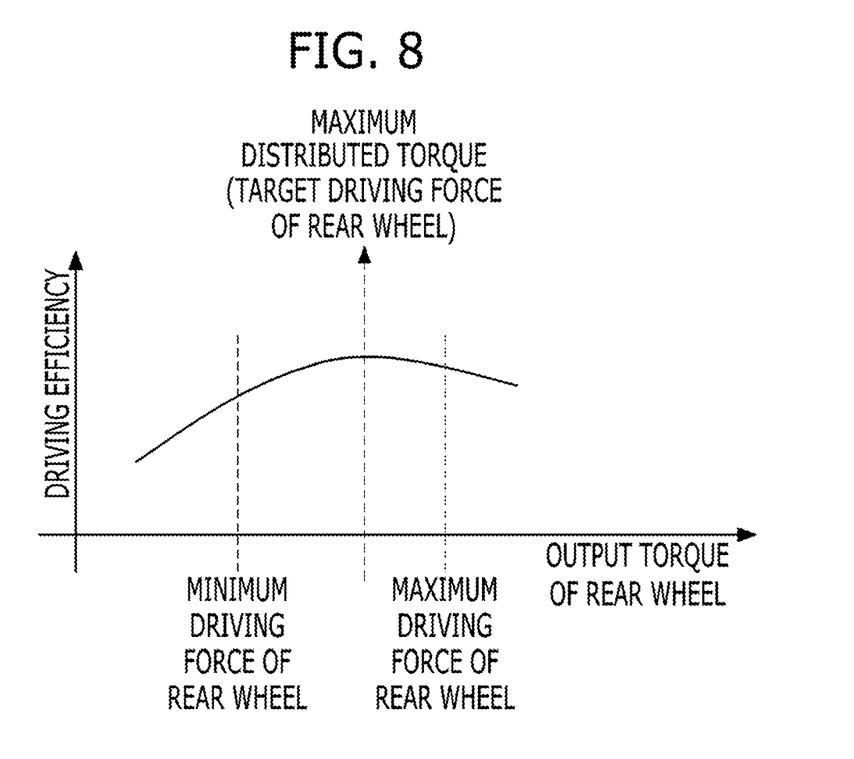
FIG. 8 is an example of determination of driving force of a driving wheel according to an embodiment of the present disclosure.

FIG. 8 is an example of determination of driving force of a driving wheel according to an embodiment of the present disclosure.

When driving force is distributed through the aforementioned procedure, this may be effective in that a driving source responsible for a specific driving wheel determines output torque for the highest efficiency within the range of available force as shown in FIG. 8. In particular, when only a motor is connected to a specific driving wheel, steering characteristics may be stably maintained irrespective of the state of a battery, and thus it may be advantageous that the behavior characteristics of a vehicle is not changed by a variable parameter such as a battery SoC.

Figure 9:
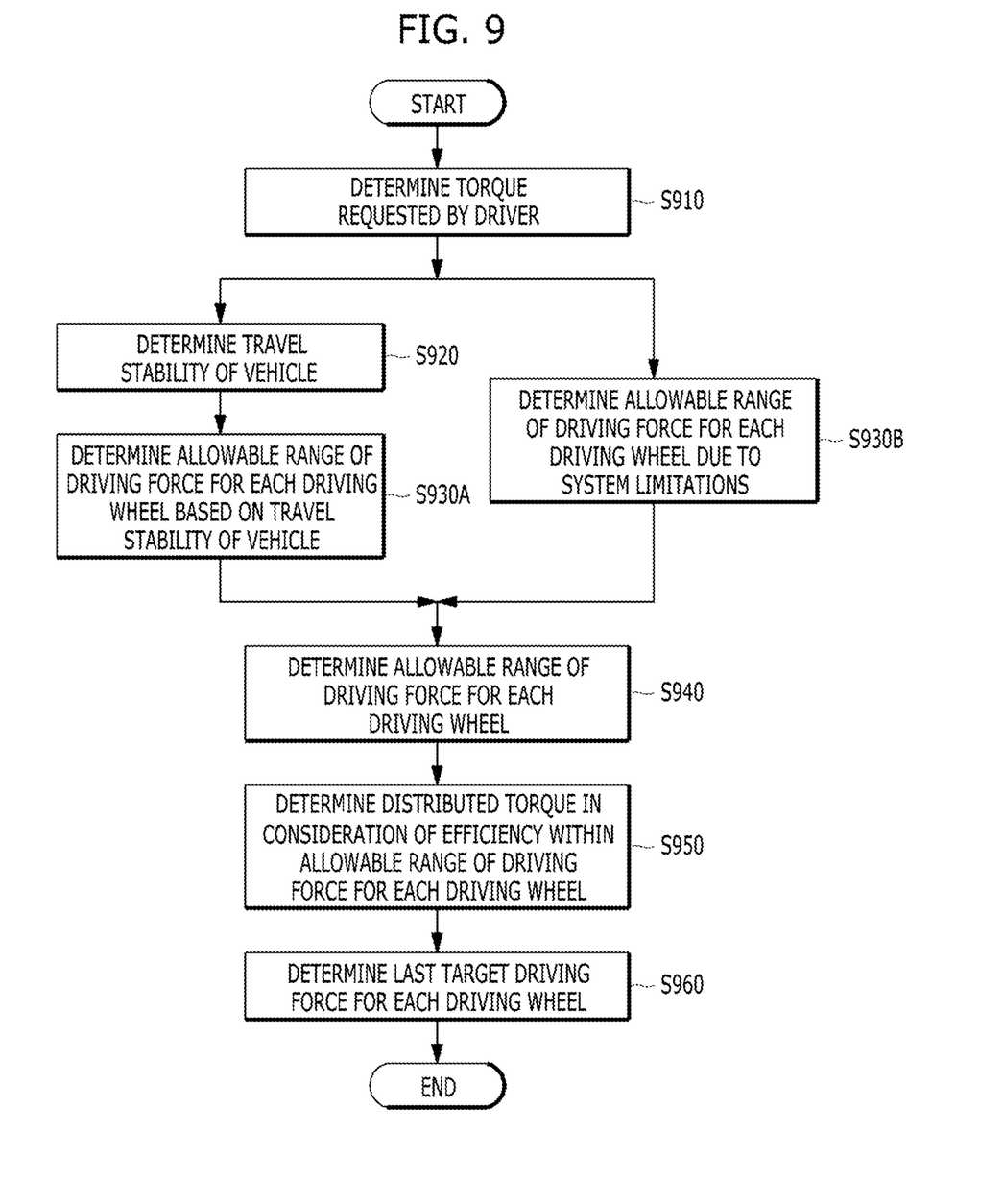
FIG. 9 is a flowchart showing an example of a procedure of distributing driving force in a four wheel drive (4WD) eco-friendly vehicle according to an embodiment of the present disclosure.

The method of distributing driving force described thus far is summarized in a flowchart of FIG. 9.

FIG. 9 is a flowchart showing an example of a procedure of distributing driving force in a 4WD eco-friendly vehicle according to an embodiment of the present disclosure.

Referring to FIG. 9, first, the HCU 240 may determine torque requested by a driver at S910.

The four wheel drive controller 260 may determine the travel stability of a vehicle based on torque requested by a driver, a longitudinal/lateral acceleration, a wheel speed for each wheel, or the like at S920 and may determine an allowable range of driving force for each driving wheel based on the determined travel stability of the vehicle at S930A.

The HCU 240 may determine an allowable range of driving force for each driving wheel due to system limitations at S930B. In this case, driving force to be output irrespective of the state of a battery may be further considered with respect to a driving wheel connected to only a motor of driving sources.

The HCU 240 may determine a range of available driving force for each driving wheel based on the allowable range of driving force for each driving wheel determined based on the travel stability and the allowable range of driving force for each driving wheel due to system limitations at S940. For example, the current operation may be performed to obtain the range of available driving force with respect to any one driving wheel of the front wheel and the rear wheel.

Then, the HCU 240 may determine target driving force of a corresponding driving wheel within the range of the available force based on the efficiency characteristics of a powertrain connected to the driving wheel, the range of available driving force of which is determined at S950.

When the target driving force of one driving wheel is determined, the target driving force of any one driving wheel may be subtracted from the torque requested by a driver to determine the target driving force of the other one driving wheel at S960.

The eco-friendly vehicle related to at least one embodiment of the present disclosure as configured above may determine a range of driving force based on travel stability for each driving wheel and a system situation and may lastly determine driving force for each driving wheel based on the efficiency of a powertrain within the range of driving force, thereby enhancing efficiency.

It will be appreciated by persons skilled in the art that that the effects that could be achieved with the present disclosure are not limited to what has been particularly described hereinabove and other advantages of the present disclosure will be more clearly understood from the detailed description.

The disclosure can also be embodied as computer-readable code on a computer-readable recording medium. The computer-readable recording medium is any data storage device that can store data which can thereafter be read by a computer system. Examples of the computer-readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method of distributing driving force of four wheel drive (4WD) eco-friendly vehicle comprising a first driving wheel connected to a first driving source and a second driving wheel connected to a second driving source, the method comprising:
   determining a first allowable range of driving force for each of the first driving wheel and the second driving wheel based on determination of travel stability;
   determining a second allowable range of driving force for each of the first driving wheel and the second driving wheel based on system limitations of at least one of the first driving source or the second driving source;
   determining a range of available driving force of the first driving wheel based on the first allowable range of driving force and the second allowable range of driving force;
   determining first target driving force of the first driving wheel based on efficiency of the first driving source within the range of available driving force; and
   determining second target driving force of the second driving wheel based on the first target driving force and requested torque.

2. The method of claim 1, wherein the determining the travel stability is performed based on at least one of a wheel speed, a longitudinal acceleration, or a lateral acceleration of each of the first driving wheel and the second driving wheel.

3. The method of claim 1, wherein the determining the first allowable range of driving force comprises:
   determining a first torque limit for each driving wheel based on feedback control; and determining a second torque limit for each driving wheel based on feedforward control.

4. The method of claim 1, wherein the determining the first allowable range of driving force comprises:
determining a first torque limit for each driving wheel for reducing wheel slip that occurs; and
determining a second torque limit for each driving wheel for preventing degradation of normal force due to weight transfer or preventing degradation of travel stability due to turning.

5. The method of claim 1, wherein the range of available driving force of the first driving wheel comprises:
determining a smallest value of a torque limit of the first driving wheel of the first allowable range of driving force and the second allowable range of driving force as first maximum driving force of the first driving wheel;
determining a smallest value of a torque limit of the second driving wheel of the first allowable range of driving force and the second allowable range of driving force as second maximum driving force of the second driving wheel; and
determining minimum driving force of the first driving wheel by subtracting the second maximum driving force from torque requested by the driver.

6. The method of claim 5, wherein any one of the first driving source and the second driving source comprises only a motor, and when the first allowable range of driving force is related to stability for turning, the second allowable range of driving force for a driving wheel connected to the driving source comprising only the motor is torque to be output from the motor irrespective of a state of a battery for supplying power to the motor.

7. The method of claim 6, wherein the torque to be output from the motor irrespective of the state of the battery comprises torque to be output during power generation using a preset minimum state of charge (SoC) of the battery or an engine.

8. The method of claim 1, wherein the first driving source comprises at least one of a first motor or a first engine; and
wherein the second driving source comprises at least one of a second motor or a second engine.

9. A computer-readable recording medium having recorded thereon a program for executing the method of claim 1.

10. A four wheel drive (4WD) eco-friendly vehicle, the vehicle comprising:
a first driving source;
a first driving wheel connected to the first driving source;
a second driving source;
a second driving wheel connected to the second driving source;
a first controller configured to determine a first allowable range of driving force for each of the first driving wheel and the second driving wheel based on determination of travel stability; and
a second controller configured to determine a second allowable range of driving force for each of the first driving wheel and the second driving wheel based on system limitations of at least one of the first driving source or the second driving source, to determine a range of available driving force of the first driving wheel based on the first allowable range of driving force and the second allowable range of driving force, to determine first target driving force of the first driving wheel based on efficiency of the first driving source within the range of available driving force, and to determine second target driving force of the second driving wheel based on the first target driving force and requested torque.

11. The 4WD eco-friendly vehicle of claim 10, wherein the travel stability is determined based on at least one of a wheel speed, a longitudinal acceleration, or a lateral acceleration of each of the first driving wheel and the second driving wheel.

12. The 4WD eco-friendly vehicle of claim 10, wherein the first allowable range of driving force comprises a first torque limit for each driving wheel based on feedback control and a second torque limit for each driving wheel based on feedforward control.

13. The 4WD eco-friendly vehicle of claim 10, wherein the first allowable range of driving force comprises a first torque limit for each driving wheel for reducing wheel slip that occurs, and a second torque limit for each driving wheel for preventing degradation of normal force due to weight transfer or preventing degradation of travel stability due to turning.

14. The 4WD eco-friendly vehicle of claim 10, wherein the second controller determines a smallest value of a torque limit of the first driving wheel of the first allowable range of driving force and the second allowable range of driving force as first maximum driving force of the first driving wheel, determines a smallest value of a torque limit of the second driving wheel of the first allowable range of driving force and the second allowable range of driving force as second maximum driving force of the second driving wheel, and determines minimum driving force of the first driving wheel by subtracting the second maximum driving force from torque requested by the driver.

15. The 4WD eco-friendly vehicle of claim 14, wherein, when any one of the first driving source and the second driving source comprises only a motor, the second controller determines the second allowable range of driving force for a driving wheel connected to the driving source comprising only the motor as torque to be output from the motor irrespective of a state of a battery for supplying power to the motor when the first allowable range of driving force is related to stability for turning.

16. The 4WD eco-friendly vehicle of claim 15, wherein the torque to be output from the motor irrespective of the state of the battery comprises torque to be output during power generation using a preset minimum state of charge (SoC) of the battery or an engine.

17. The 4WD eco-friendly vehicle of claim 10, wherein the first driving source comprises at least one of a first motor or a first engine; and
wherein the second driving source comprises at least one of a second motor or a second engine.

* * * * *